Jan. 10, 1961     H. G. BRAENDEL     2,967,746
PISTON RING
Filed July 27, 1960
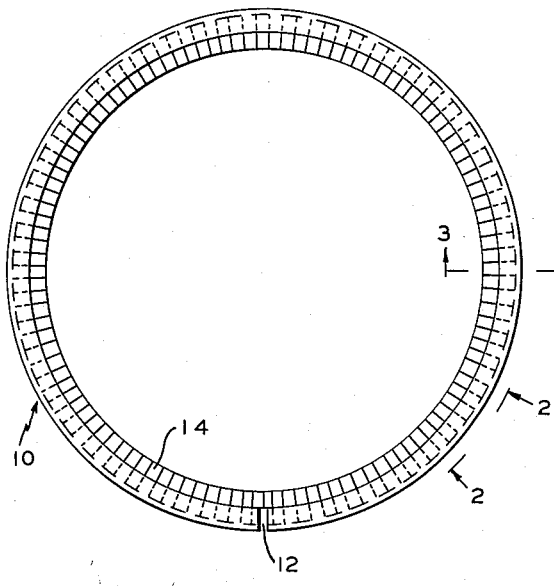
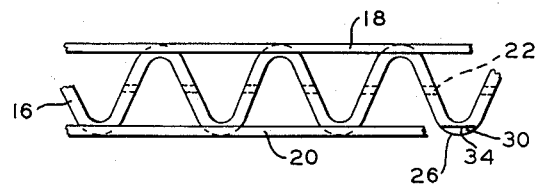
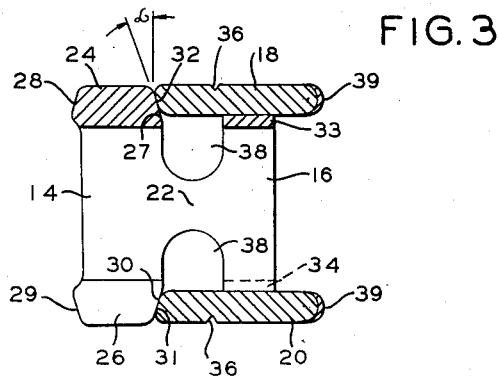
INVENTOR.
HELMUTH G. BRAENDEL
BY Arthur H. Seidel
ATTORNEY United States Patent Office 2,967,746
Patented Jan. 10, 1961

2,967,746
PISTON RING

Helmuth G. Braendel, Malvern, Pa., assignor to Wilkening Mfg. Co., Philadelphia, Pa., a corporation of Delaware Filed July 27, 1960, Ser. No. 45,730
3 Claims. (Cl. 309—44)

The present invention relates to a piston ring, and more particularly to a piston ring adapted to be installed in piston ring grooves on a piston in an internal combustion engine.

The efficiency and the fuel consumption of an internal combustion engine are greatly affected by the construction of piston rings. The piston rings must be designed so as to be able to ride on a thin film of oil on the internal surface of the cylinder wall and permit the free passage of oil through the rings into the internal portion of the piston without clogging. Recent designs of piston ring grooves include drain passages which are parallel to the peripheral surface of the piston thereby eliminating a major portion of the bottom wall of the groove. Thus, conventional piston rings cannot be utilized since the expander will drop through the drain passage.

It is an object of the present invention to provide a novel piston ring for internal combustion engines.

It is another object of the present invention to provide a piston ring capable of being used in piston ring grooves wherein a drain passage is provided in the bottom wall of the groove adjacent the rear wall of the groove.

It is another object of the present invention to provide a piston ring having a fewer number of parts.

It is another object of the present invention to provide a piston ring which is less susceptible to plugging and provides for increased passage of oil with the least amount of radial obstruction.

Other objects will appear hereinafter.

For the purpose of illustrating the invention there is shown in the drawings forms which are presently preferred; it being understood, however, that this invention is not limited to the precise arrangements and instrumentalities shown.

Figure 1 is a plan view of the piston ring of the present invention.

Figure 2 is a partial side elevational view of the piston ring shown in Figure 1 on an enlarged scale taken along the lines 2—2.

Figure 3 is a cross sectional view on an enlarged scale taken along the lines 3—3 in Figure 1.

Referring to the drawing in detail, wherein like numerals indicate like elements, there is shown in Figure 1 a piston ring 10.

Piston ring 10 is annular in shape and has a diameter of approximately four inches. A gap 12 is provided in the piston ring 10 as is conventional in the art. The piston ring 10 comprises an expander 14, a spacer 16 integral with the expander 14, a top rail 18 and a bottom rail 20.

As shown more clearly in Figure 3, the integral connection between the expander 14 and the spacer 16 is a web 22.

The expander 14 is made of spring steel and is sinuously corrugated throughout its length thereby forming upper peak 24 and lower peak 26. As shown more clearly in Figure 3, the upper peak 24 is provided with tapered sides 27 and 28 which converge upwardly in an axial direction. Likewise, the lower peak 26 is provided with tapered sides 29 and 30 which converge downwardly in an axial direction. The sides 27 and 30 diverge from the normal by an angle alpha. The angle alpha may, for example, be approximately twelve degrees. The top and bottom rails 18 and 20 are provided with tapered surfaces 31 and 32 which mate with the tapered surfaces 30 and 27, respectively, on the expander 14. The free ends of the expander 14 abut within the gap 12 as seen in Figure 1.

The spacer 16 and the expander 14 are made from the same strip of spring metal. The spacer 16 is corrugated, when viewed in elevation, in exactly the same manner as the expander 14. Thus, the expander 14 and the spacer 16 are indistinguishable when viewed in elevation as shown in Figure 2.

The height of the spacer 16 between the top peak 33 and the bottom peak 34 is substantially less than the height of the expander 14. The top rail 18 is supported on the top peak 33 of the spacer 16 and has a thickness which enables the top surface of the top rail 18 to be substantially flush with the top surface of the peak 24 on the expander 14. The bottom rail 20 is juxtaposed to the bottom peak 34 on the spacer 16 and has a thickness so that the bottom surface on the bottom rail 20 is substantially flush with the bottom surface on the bottom peak 26 of the expander 14. Each of the top and bottom rails 18 and 20 is provided with a notch 36 for assisting in proper assembly.

The tapered sides 27—30 on the top and bottom peaks 24 and 26 makes the top and bottom peaks 24 and 26 a trapezoid when viewed in transverse cross section.

When the piston ring 10 is compressed, the tapered surfaces 27 and 30 on the expander 14 matingly engage with the tapered surfaces 31 and 32 on the rails 18 and 20. As the expander 14 tends to expand, the surfaces 27 and 30 impart a tangential force which biases the top rail 18 and the bottom rail 20 outwardly in an axial and a radial direction. The spacer 16 maintains the top and bottom rails in spaced alignment. It has been found that the mating contour between the surfaces 27, 30, 31 and 32 provides for less wear between the engaging surfaces. Also, the piston ring has improved stability, improved side loading for better sealing, and the rails 18 and 20 hug the sides of the piston groove better under high vacuum conditions.

Since the expander 14 is integral with the spacer 16, the piston ring consists of a fewer number of parts. A conventional piston ring comprises four parts whereas the piston ring of the present invention comprises only three parts. Since the expander 14 is integral with the spacer 16, the piston ring of the present invention may be utilized in pistons wherein the oil drain passage is adjacent the back wall of the piston groove and occupies a major portion of the bottom surface of the piston groove. Thus, the expander 14 of the present invention cannot fall down through the oil drainage passage. When the expander in a conventional piston ring is made separate from the spacer, the expander will fall through the oil drainage groove.

Since both the expander 14 and the spacer 16 are sinuously corrugated, the piston ring 10 is less susceptible to plugging and provides for increased flow of oil to the drain passage. The provision of the web 22 joining the expander 14 and the spacer 16 results in spaces 38 which provide for flow of oil in a circumferential or arcuate direction. This provides for increased circulation of oil.

The outer peripheral surface of the rails 18 and 20 are preferably curved and provided with chrome plating 39 as shown in Figure 3 so as to have a durable line contact with the inner peripheral surface of the cylinder wall. As seen more clearly in Figure 1, each of the expander 14, the spacer 16, the top rail 18 and the bottom rail 20 are annular in shape.

The present invention may be embodied in other specific forms without departing from the spirit or essential attributes thereof and, accordingly, reference should be made to the appended claims, rather than to the foregoing specification as indicating the scope of the invention.

I claim:

1. A piston ring comprising an expander and a spacer sinuously corrugated in phase, said spacer having a height less than said expander and having its inner peripheral surface coextensive with the inner peripheral surface of said expander, a top rail on the top peaks of said spacer, the uppermost surface of said top rail being flush with the uppermost surface of the top peaks of said expander, a bottom rail juxtaposed to the lowermost surface of the bottom peaks of said spacer, the bottommost surface of said bottom rail being flush with the bottommost surface of the bottom peaks of said expander, the top and bottom peaks of said expander matingly engaging said top and bottom rails so that said expander imparts a radial force to said rails as said expander expands, and a web integral with said spacer and said expander securedly joining said spacer and said expander and defining a space for circumferential flow of oil.

2. A piston ring as set forth in claim 1 wherein the mating engagement of said expander and said rails comprises tapered surfaces on said expander and said rails.

3. A piston ring as set forth in claim 2 wherein said tapered surfaces converge toward said spacer, whereby said web and the mating engagement of said tapered surfaces are capable of being the sole support for said expander when mounted within a groove on a piston.

No references cited.